United States Patent [19]

Jäckel et al.

[11] Patent Number: 5,441,452
[45] Date of Patent: Aug. 15, 1995

[54] ANTIFRICTION BEARING FOR USE IN APPARATUS FOR DAMPING FLUCTUATIONS OF TORQUE IN POWER TRAINS OF MOTOR VEHICLES

[75] Inventors: Johann Jäckel, Baden-Baden; Albert Albers, Bühl, both of Germany

[73] Assignee: Luk lamellen und Kupplungsbau GmbH, Bühl, Germany

[21] Appl. No.: 378,943

[22] Filed: Jan. 26, 1995

Related U.S. Application Data

[60] Continuation of Ser. No. 191,791, Feb. 1, 1994, abandoned, which is a division of Ser. No. 891,599, Jun. 1, 1992, Pat. No. 5,310,267.

[30] Foreign Application Priority Data

Jun. 1, 1991 [DE] Germany .................... 41 18 079
Aug. 2, 1991 [DE] Germany .................... 41 25 656

[51] Int. Cl.⁶ .................................................. F16D 3/66
[52] U.S. Cl. ........................................ 464/61; 464/64
[58] Field of Search ............... 384/462, 473, 476, 477, 384/481, 482, 484, 485, 486, 499, 502, 536, 584, 585, 564, 559, 560, 51, 513, 542; 464/66, 68, 61, 62, 64; 74/574

[56] References Cited

U.S. PATENT DOCUMENTS

| | | | |
|---|---|---|---|
| 3,594,050 | 7/1971 | Gothberg | 384/484 |
| 3,819,243 | 6/1974 | Asberg et al. | 384/542 |
| 4,872,770 | 10/1989 | Dickinson | 384/477 |
| 4,874,350 | 10/1989 | Casse et al. | 464/66 X |
| 4,932,921 | 6/1990 | Kobayashi et al. | 74/574 X |
| 4,989,710 | 2/1991 | Reik et al. | 464/68 |
| 5,073,143 | 12/1991 | Friedman et al. | 464/64 X |

FOREIGN PATENT DOCUMENTS

| | | | |
|---|---|---|---|
| 643987 | 7/1962 | Canada | 384/473 |
| 15067 | 9/1903 | United Kingdom | 384/502 |
| 2244543 | 12/1991 | United Kingdom | 464/68 |

*Primary Examiner*—Thomas R. Hannon
*Attorney, Agent, or Firm*—Darby & Darby

[57] ABSTRACT

A bearing which can be used between two coaxial flywheels has an inner race, an outer race, one or more annuli of antifriction bearing elements between the two races, a metallic or plastic enclosure which surrounds the peripheral surface of the outer race and a portion of the internal surface of the inner race and has a wall extending along first axial ends of the races. The wall has an outwardly bulging pocket for confinement of lubricant in addition to that which is confined in the space between the inner and outer races. Such space is sealed at the second axial ends of the races by a ring which is installed between the two races or surrounds a portion of the peripheral surface of the outer race and sealingly engages the inner race.

14 Claims, 3 Drawing Sheets

ANTIFRICTION BEARING FOR USE IN APPARATUS FOR DAMPING FLUCTUATIONS OF TORQUE IN POWER TRAINS OF MOTOR VEHICLES

This is a continuation of application Ser. No. 08/191,791, filed Feb. 1, 1994, now abandoned, which is a divisional of Ser. No. 07/891,599, filed Jun. 1, 1992, now issued as U.S. Pat. No. 5,310,267, on May 10, 1994.

BACKGROUND OF THE INVENTION

The invention relates to improvements in apparatus for damping fluctuations of torque in power trains, particularly in the power trains of motor vehicles. More particularly, the invention relates to improvements in bearings between rotary components (such as coaxial flywheels) which can be utilized in the above outlined apparatus. Still more particularly, the invention relates to improvements in friction reducing units which can be utilized between the flywheels of clutch plates, torque damping apparatus and like assemblies.

Apparatus in which the improved bearings can be put to use are disclosed, for example, in commonly owned U.S. patent application Ser. No. 07/708,934 filed May 31, 1991 by Wolfgang Reik et al. for "Apparatus for transmitting torque in the power trains of motor vehicles"; in (commonly owned German patent application Serial No. P 40 27 6295; in) commonly owned copending U.S. patent application Ser. No. 07/708,930 filed May 31, 1991 by Oswald Friedmann for "Apparatus for transmitting torque to between the engine and the transmission of a motor vehicle"; and in commonly owned copending U.S. patent application Ser. No. 07/708,935 filed May 31, 1991 by Oswald Friedmann for "Twin-flywheel apparatus for transmitting torque in the power train of a motor vehicle". The disclosures of the above enumerated patent applications are incorporated herein by reference.

OBJECTS OF THE INVENTION

An object of the invention is to provide a bearing whose useful life is longer than that of heretofore known bearings.

Another object of the invention is to provide an antifriction bearing which need not be lubricated subsequent to installation between two or more rotary parts or between one or more stationary parts and one or more rotary parts.

A further object of the invention is to provide a compact bearing which can stand pronounced axial and/or radial stresses when installed between two flywheels or elsewhere between two rotary components or a rotary component and a stationary component.

An additional object of the invention is to provide a simple, compact and inexpensive bearing whose cost is a fraction of the cost of a conventional bearing but which can stand all kinds of stresses that can be withstood by heretofore known bearings.

Still another object of the invention is to provide an apparatus which embodies one or more bearings of the above outlined character.

A further object of the invention is to provide a bearing which can be installed in close or immediate proximity to one or more heat generating parts or devices without affecting its useful life and/or quality of operation.

Another object of the invention is to provide novel and improved means for preventing the escape of lubricant for the rolling elements of the above outlined bearing.

An additional object of the invention is to provide a bearing which can be installed in or removed from an apparatus or the like with little loss in time.

Still another object of the invention is to provide a prefabricated unit or module which embodies the above outlined antifriction bearing.

A further object of the invention is to provide a novel combination of an antifriction bearing and an enclosure for its races.

Another object of the invention is to provide a novel and improved module which embodies the above outlined antifriction bearing.

An additional object of the invention is to provide a torque transmitting apparatus, particularly for use in motor vehicles, which embodies a bearing of the above outlined character.

Still another object of the invention is to provide a novel and improved module which reduces friction between the flywheels of a composite flywheel in the above outlined torque transmitting apparatus.

A further object of the invention is to provide a novel and improved method of confining a large quantity of lubricant for the rolling elements between the races of an antifriction bearing.

SUMMARY OF THE INVENTION

One feature of the invention resides in the provision of an antifriction bearing for use between coaxial first and second rotary components, e.g., between the primary and secondary flywheels of a composite flywheel in an apparatus for damping torque in the power train between the engine and the variable-speed transmission of a motor vehicle. The improved bearing comprises an outer race, an inner race which is coaxial with, at least partially surrounded by and disposed radially inwardly of the outer race, and an enclosure or jacket including a first wall between the outer race and one of the rotary components, and a second wall extending from the first wall inwardly along an axial end of the outer race to an axial end of the inner race. The second wall has at least one lubricant-confining pocket which extends substantially axially of the races and away from their aforementioned axial ends. The one component (which is adjacent the first wall of the enclosure) can constitute the secondary flywheel of the aforementioned composite flywheel.

The enclosure can contain a heat insulating material, and the second wall can include a radially inner portion which is surrounded by the inner race of the bearing. The internal surface of the inner race can be provided with a recess for the radially inner portion of the second wall. Such radially inner portion of the second wall and the inner race can define at least one sealing gland with one or more clearances. Alternatively or in addition to the at least one sealing gland, the radially inner portion of the second wall and the inner race can define at least one friction bearing. The radially inner portion of the second wall and the inner race have confronting surfaces and at least one of these surfaces can be provided with at least one annular projection extending toward the other surface.

The enclosure can contain or consist of a plastic material, and such plastic material is preferably a heat insulating material. Alternatively, the enclosure can be made of, or can contain, a metallic sheet material.

The bearing can further comprise a preferably reinforced sealing ring which operates between the inner and outer races, and such sealing ring is preferably disposed at those axial ends of the races which are remote from the second wall of the enclosure. The outer wall can be provided with an axial extension which is adjacent its internal surface at that end of the outer race which is remote from the second wall of the enclosure, and a portion of the sealing ring can surround such extension of the outer race. The external surface of the outer race can be provided with an annular recess which is remote from the second wall of the enclosure, and the substantially axially extending radially outer portion of the sealing ring preferably extends into such recess. The radially outer portion of the sealing ring can be confined between the outer race and the first wall of the enclosure and can comprise an elastic annular bead which is preferably stressed in the axial and/or radial direction of the races. At least one of the confronting surfaces of the outer race and the first wall of the enclosure (such surfaces flank the bead) can be provided with an annular groove which receives the bead in stressed condition.

In accordance with one presently preferred embodiment, the inner race of the bearing has a substantially L-shaped cross-sectional outline and includes a substantially axially extending first leg and a second leg which can extend substantially radially of the races and inwardly from the first leg. The second leg of the inner race and one of the rotary components have means for coupling the second leg to such rotary component, preferably the primary flywheel. The bearing further comprises at least one row of rolling elements between the inner and outer races, and the axially extending first leg of the inner race can be provided with a track for the at least one row of rolling elements. At least one leg of the just discussed second race can be made of a metallic sheet material.

The rolling elements of the at least one row can constitute spheres, and such rolling elements can be confined exclusively by the inner and outer races, i.e., the bearing need not employ a cage for the rolling elements.

At least one of the races, particularly the outer race, can be split to facilitate introduction of rolling elements between the inner and outer races. In other words, the outer race is preferably expandible and contractible, and such bearing preferably further comprises means (such as the aforementioned sealing ring) for maintaining the outer race in contracted condition upon completed introduction of rolling elements between the inner and outer races.

The enclosure and at least one of the races (such as the outer race) can constitute a prefabricated module to facilitate and simplify the assembly of the bearing with the rotary components.

The second wall of the enclosure includes a first portion between the first wall and the at least one pocket and a second portion, with the at least one pocket located radially between the first and second portions of the second wall. At least one of the two portions of the second wall can make an oblique angle with the common axis of the inner and outer races. Such at least one portion of the second wall can constitute a hollow conical frustum.

Another feature of the invention resides in the provision of a bearing which comprises an outer race having first and second axial ends and a peripheral surface, an inner race which is coaxial with and is at least partially surrounded by the outer race and has first and second axial ends at the respective axial ends of the outer race, and an enclosure having a first wall adjacent the peripheral surface of the outer race, a second wall at the first axial ends of the two races, and a third wall surrounded by a portion at least of the internal surface of the inner race.

A further feature of the invention resides in the provision of a bearing including an outer race having a peripheral surface and first and second axial ends, an inner race which is coaxial with and is at least partially surrounded by the outer race and has first and second axial ends at the respective axial ends of the outer race, and an enclosure including a first wall adjacent the peripheral surface of the outer race and a second wall at the first axial ends of the two races. The enclosure consists of a plastic material, particularly a heat insulating plastic material.

An additional feature of the invention resides in the provision of a bearing comprising an outer race having an internal surface, first and second axial ends and an annular extension adjacent the internal surface at the first axial end, an inner race coaxial with and at least partially surrounded by the outer race and having first and second axial ends at the respective axial ends of the outer race, and a reinforced sealing ring which sealingly surrounds the extension of the outer race and sealingly engages the first axial end of the inner race.

Still another feature of the invention resides in the provision of a bearing which can be used between first and second rotary components and comprises an outer race, an inner race coaxial with and at least partially surrounded by the outer race and having a substantially L-shaped cross-sectional outline with a first leg extending substantially axially of the races and a second leg, means for coupling the second leg with one of the rotary components, and at least one row of rolling elements between the two races. The first leg of the inner race has a track for the rolling elements.

A further feature of the invention resides in the provision of a bearing comprising an outer race, an inner race coaxial with and at least partially surrounded by the outer race, and at least one row of spherical rolling elements which are confined between the two races. The rolling elements are confined exclusively by the two races, i.e., the bearing need not be provided with a cage for the rolling elements.

The novel features which are considered as characteristic of the invention are set forth in particular in the appended claims. The improved bearing itself, however, both as to its construction and the mode of installing the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
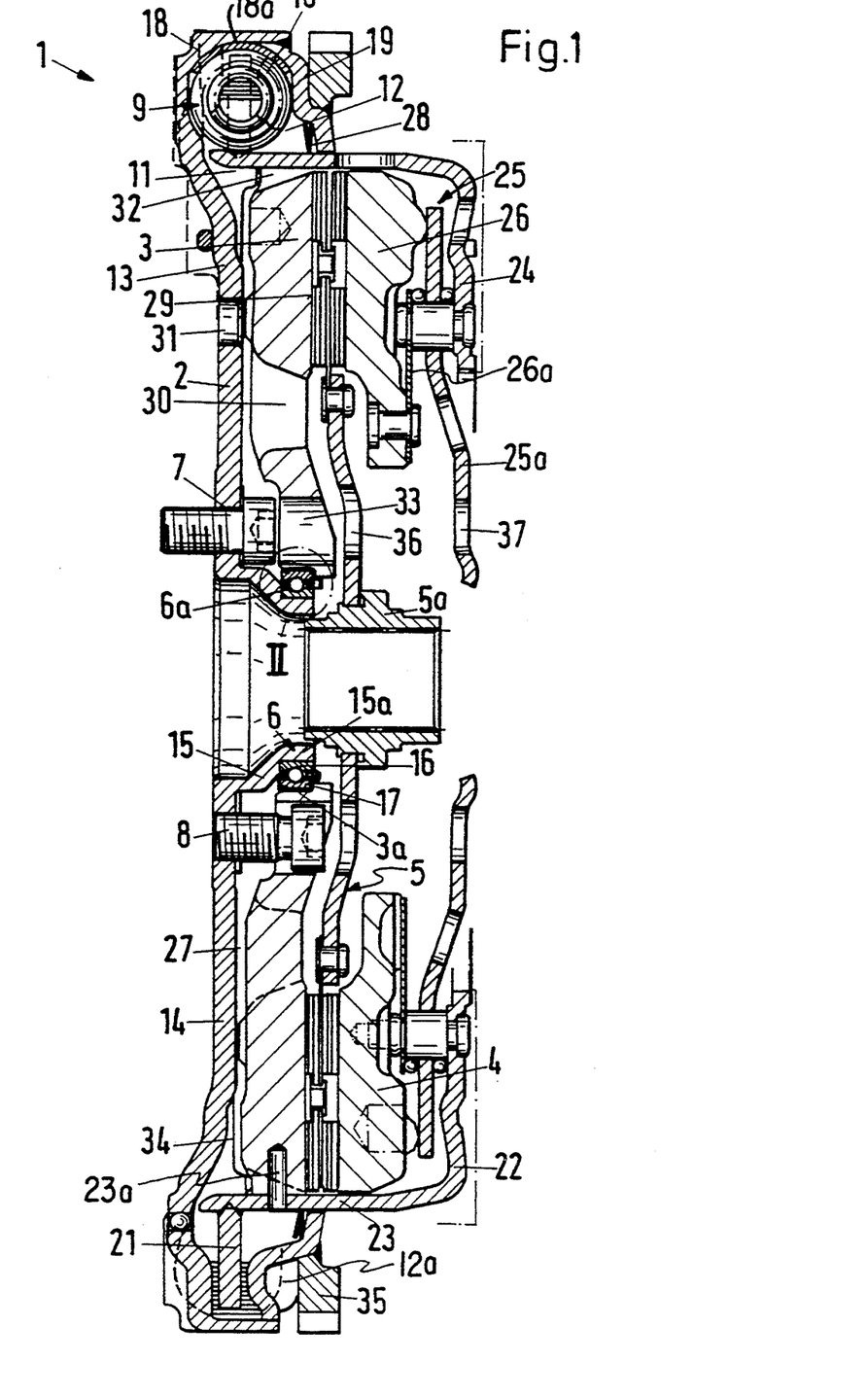
FIG. 1 is an axial sectional view of an apparatus for damping torque between the engine and the variable-speed transmission of a motor vehicle wherein an improved anti-friction bearing is installed between two coaxial flywheels one of which is driven by the engine and the other of which transmits torque to the transmission by way of a friction clutch.

The apparatus which is shown in FIG. 1 comprises a composite flywheel 1 including a first or primary flywheel 2 which can be coupled to the output element (e.g., a crank-shaft) of an internal combustion engine in a motor vehicle, and a second or secondary flywheel 3 which is coaxial with the primary flywheel 2 and can transmit torque to the clutch plate 5 of, a friction clutch 4. The clutch plate 5a carries or includes a hub 5a which transmits torque to the input shaft of a variable-speed transmission in the motor vehicle. The internal surface of the hub 5a has axially parallel teeth which cooperate with complementary external teeth of the input shaft.

Figure 2:
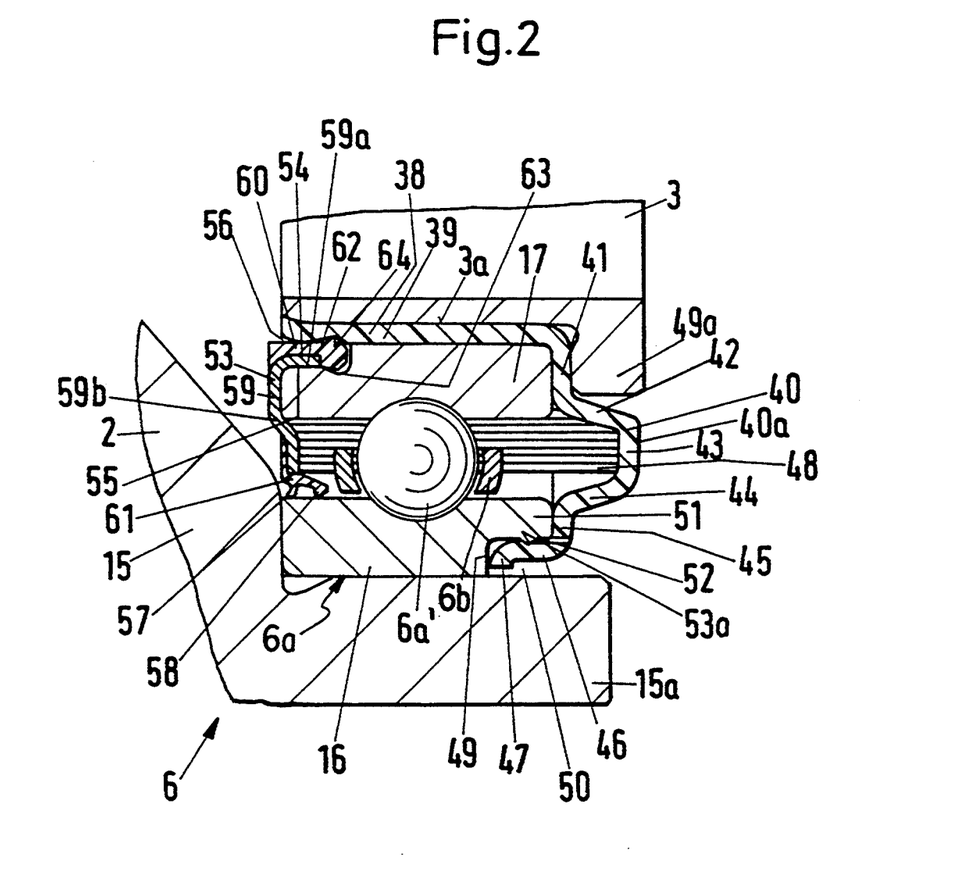
FIG. 2 is an enlarged view of a detail II in the structure of FIG. 1.

The apparatus of FIG. 1 further comprises a friction reducing unit 6 which is installed between the flywheels 2, 3 and includes or constitutes an antifriction ball bearing 6a having an inner race 16, an outer race 17 spacedly surrounding at least a portion of the inner race 16, and a row or annulus of spherical rolling elements 6a' (see also FIG. 2). The bearing 6a is disposed radially inwardly of an annulus of bolts or other suitable fasteners 8 which serve to separably affix the flywheel 2 to the output element of the engine and have externally threaded shanks extending through circular openings (holes or bores) in a radially extending flange-like portion 14 of the flywheel 2.

A damper 9 is disposed between and serves to oppose angular movements of the flywheels 2, 3 relative to each other. The illustrated damper 9 comprises arcuate elongated energy storing elements 10 in the form of coil springs which extend circumferentially of the composite flywheel 1 and are confined in the annular radially outermost portion or compartment 12 of an annular chamber 11 which is defined by the primary flywheel 2. At least a portion of the chamber 11 is filled with a viscous hydraulic lubricant, such as oil or grease.

The primary flywheel 2 comprises a first part or section 13 and a second part or section 19. The section 13 includes the aforementioned radially extending portion 14 which is adjacent the engine and is traversed by the shanks of the fasteners 8, a centrally located ring-shaped portion or protuberance 15 which is integral with the radially innermost part of the portion 14 and has a smaller-diameter cylindrical end portion 15a surrounded by the inner race 16 of the antifriction bearing 6a, and an axially extending dished or substantially C-shaped (in cross-section) radially outermost portion 18 which is integral with the radially outermost part of the portion 14 and surrounds the compartment 12 of the annular chamber 11. The section 13 constitutes the main part of the flywheel 2 and the free end of its axially extending portion 18 is welded to the radially outermost portion of the second section 19. Each of the sections 13, 19 can be made of metallic sheet material. The holes or bores (openings) of the flange-like radial portion 14 forming part of the main section 13 of the primary flywheel 2 surround the protuberance 15.

The bearing 6a can comprise two or more rows of spherical, barrel-shaped or other suitable rolling elements 6a'. However, it is presently preferred to employ a single row or annulus of spherical rolling elements which may but need not be confined in a cage, i.e., such rolling elements may be confined exclusively by the races 16, 17 of the bearing 6a. A cage 6b is shown in FIG. 2.

The illustrated secondary flywheel 3 constitutes or resembles a disc and spacedly surrounds the outer race 17 of the bearing 6a. To this end, the flywheel 3 is provided with a centrally located circular opening 3a having a diameter which slightly exceeds the diameter of the peripheral surface of the outer race 17.

The radially outermost portion 18 of the main section 13 of the flywheel 2 surrounds at least the radially outermost portions of the energy storing elements 10 of the damper 9 and can be provided with a friction- and wear-reducing internal liner 18a which comes in direct contact with the elements 10. These elements 10 bear against the liner 18a at least when the flywheel 2 rotates so that the elements 10 are subjected to the action of centrifugal force. The radially outermost part of the radially extending portion 14 of the section 13 cooperates with the section 19 to flank the compartment 12 of the chamber 11 and hence the energy storing elements 10 of the damper 9.

The energy storing elements 10 of the damper 9 are installed in discrete arcuate recesses which form part of the compartment 12 and are separated from each other by abutments or stops (one shown in the lower part of FIG. 1, as at 12a) which alternate with the elements 10 (as seen in the circumferential direction of the flywheel 2) and can form integral (inwardly deformed) parts of the radially extending portion 14 and section 19. Each of these abutments or stops 12a can be said to constitute a pocket which is depressed into the external surface of the respective part (portion 14 or section 19) of the flywheel 2.

The secondary flywheel 3 carries abutments or stops 21 for the energy storing elements 10 of the damper 9. The stops 21 are lugs or arms which are welded to and extend radially outwardly from a cylindrical portion 23 of the housing or cover 22 of the friction clutch 4. The cylindrical portion 23 of the clutch housing 22 is non-rotatably secured to the periphery of the secondary flywheel 3 by a set of radially disposed pins 23a. When the flywheels 2, 3 assume their neutral positions in which the energy storing elements 10 are unstressed or are subjected to a minimal stress, the stops 21 are disposed in the gaps between the neighboring pairs of axially aligned stops 12a on the flywheel 2. One stop of each pair of stops 12a is provided on the section 19, and the other stop of each pair of stops 12a is provided on the radially extending flange-like portion 14 of the main section 13.

The secondary flywheel 3 serves to transmit torque to as well as to center the axially extending cylindrical or substantially cylindrical portion 23 of the clutch housing 22. The latter further comprises a radially inwardly extending portion 24 which is remote from the stops 21 and carries a diaphragm spring 25 forming part of the clutch 4. The diaphragm spring 25 is tiltable relative to the portion 24 of the housing 22 and acts not unlike a two-armed lever. The radially outer portion of the diaphragm spring 25 urges an axially movable pressure plate 26 of the clutch 4 against the adjacent friction lining of the clutch plate 5 when the clutch 4 is engaged. This causes the other friction lining of the clutch plate 5 to frictionally engage an annular friction surface 29 of the secondary flywheel 3 so that the flywheel 3 can drive the hub 5a (and hence the input shaft of the variable-speed transmission) through the medium of the clutch plate 5.

FIG. 1 shows that at least the major part of the annular chamber 11 (and the entire compartment 12) is located radially outwardly of the secondary flywheel 3. This contributes to compactness of the apparatus because the disc-shaped flywheel 3 can be installed in immediate or close proximity to the radially extending portion 14 of the main section 13 of the primary flywheel 2, i.e., close to the engine of the motor vehicle in which the improved apparatus is put to use. The flywheel 3 and the portion 14 of main section 13 of the flywheel 2 define a relatively narrow radially extending clearance 27. All in all, the just described dimensioning and mounting of the flywheel 3 (so that it can be surrounded by the annular chamber 11 of the flywheel 2) contribute significantly to compactness of the apparatus as considered in the axial direction of the flywheels 2, 3 and clutch 4 including its clutch plate 5. In order to ensure that the flywheel 3 can be placed as close to the engine (i.e., to the portion 14 of the flywheel 2) as possible, one (28) of the sealing devices 28, 34 for the chamber 11 is installed between the peripheral surface of the axially extending portion 23 of the clutch housing 22 and the internal surface of the radially innermost portion of the section 19. As can be seen in FIG. 1, the improved apparatus is designed in such a way that the radial clearance 27 between the portion 14 and the flywheel 3 does not or need not accommodate any parts which would necessitate a widening of such clearance in the axial direction of the flywheels 2 and 3.

The radially extending clearance 27 can be used to establish a portion of a path for the flow of a coolant (such as air) between the flywheels 2 and 3 and to thus reduce the likelihood of overheating of the radial portion 14 by the flywheel 3 whose temperature is raised by friction heat when its surface 29 slips relative to the adjacent lining of the clutch plate 5. Another portion of the aforementioned path is established by passages 30 which are provided in the secondary flywheel 3 radially inwardly of the annular friction surface 29 and communicate with the adjacent portions of the clearance 27. Cool atmospheric air is drawn into the passages 30 when the flywheel 3 rotates, and streams or jets of such air impinge upon the adjacent zones of the radially extending portion 14. The passages 30 can be provided in addition to or in lieu of one or more substantially axially parallel passages 31 in the radially extending portion 14 of the main section 13. The passages 31 admit cool air from that side of the radially extending portion 14 which confronts the engine. The cooling action of air which enters the clearance 27 can be enhanced still further by the provision of passages (e.g., in the form of cutouts or recesses) 32 in the peripheral surface of the flywheel 3 inwardly adjacent the axially extending portion 23 of the clutch housing 22. The passages 32 can discharge heated air into the interior of the clutch housing 22 radially outwardly of the friction surface 29 of the secondary flywheel 3. The illustrated passages 32 are notches or recesses in the peripheral surface of the flywheel 3 and are surrounded by the adjacent portions of the internal surface of the axially extending portion 23 of the clutch housing 22. Each of the passages 30, 31, 32 (or at least some of these passages) can be round or can be elongated in the circumferential direction of the composite flywheel 1.

The secondary flywheel 3 is further provided with passages 33 (e.g., in the form of holes or bores) which register with the openings 7 in the radially extending portion 14 of the main-section 13 of the flywheel 2 and serve for introduction of shanks and heads of the fasteners 8. The head of the lower fastener 8 which is shown in FIG. 1 is in the process of advancing toward the radial portion 14 and is located in the corresponding hole or bore 33 of the flywheel 3. Insertion of the fasteners 8 into the apparatus (to assume positions corresponding to that of the, upper fastener 8 in FIG. 1) is further facilitated by the provision of holes or bores 36 in the radially extending portion of the clutch plate 5 and by the provision of holes or bores 37 in the radially inwardly extending elastic prongs 25a of the diaphragm spring 25. Each hole or bore 36 registers with a hole or bore 33 and with a hole or bore 37. This renders it possible to employ a relatively simple tool (not shown) whose working end can enter the hexagonal or otherwise configured non-circular recess or socket in the exposed end face of the head of a fastener 8 in order to facilitate introduction of such fastener through the aligned holes or bores 37, 36, 33 (in such order) and rotation of the inserted fastener until the shank properly engages the internal thread in the tapped hole of the output element of the engine and the head comes into abutment with the right-hand (inner) side of the radial portion 14 of main section 13 of the primary flywheel 2.

As already mentioned hereinbefore, the sealing device 28 for the chamber 11 operates between the external surface of the axially extending portion 23 of the clutch housing 22 and the adjacent side of the radially inner portion of the section 19. This sealing device is located radially outwardly of the sealing device 34 which operates between the inner side of the radially extending portion 14 and the adjacent side of the radially outermost portion of the flywheel 3. At least the sealing device 34 can comprise a membrane or a diaphragm spring which reacts against the radially extending portion 14 and bears against the flywheel 3. Alternatively, the radially outermost portion of the sealing device 34 can sealingly engage the internal surface of the axially extending portion 23 of the clutch housing 22, and the radially innermost portion of such sealing device then bears against the adjacent inner side of the radially extending portion 14 to seal the radially outermost part of the clearance 27 from the adjacent portion of the chamber 11. Such mounting of the sealing device 34 is preferred at this time because the axially extending portion 23 can serve as a means for centering this sealing device.

FIG. 1 further shows a ring-shaped starter gear 35 which is welded to the section 19 of the primary flywheel 2.

The composite flywheel 1 and the friction clutch 4 (including its clutch plate 5) are preferably assembled into a module right at the manufacturing plant to simplify installation of such module in the power train between the engine and the variable-speed transmission of a motor vehicle. Assembly of the flywheels 2, 3 and clutch 4 into a prefabricated module also simplifies storage and shipment to the automobile making concerns. The manner in which the prefabricated or preassembled module can be mounted on the output element of an engine (with fasteners 8 which are caused to pass through aligned holes or bores 37, 36, 33 and the respective openings 7) was described hereinabove.

The assembly of the module is preferably carried out in the following way: The first step involves assembly of the clutch housing or cover 22 with the secondary flywheel 3 while the clutch plate 5 is located between the friction surface 29 and the pressure plate 26. The latter is axially movably but non-rotatably secured to the housing 22 by leaf springs 26a. This results in the assembly of a smaller module or submodule including the flywheel 3 and the friction clutch 4. The next step involves insertion of the flywheel 3 of such submodule into the space within the annular chamber 11 and into close proximity to the radially extending portion 14 of main section 13 of the primary flywheel 2 to establish the clearance 27, and the third step includes welding of the section 19 to the section 13 (subsequent to insertion of energy storing elements 10 into the compartment 12 of the annular chamber 11). The section 19 of the primary flywheel 2 can be slipped onto the cylindrical portion 23 of the clutch housing 22 in a direction from the right, as viewed in FIG. 1. The aforementioned third step is preceded by mounting of the sealing device 34 on the axially extending portion 23 of the clutch housing 22 or on the radially extending portion 14 of the main section 13. The same applies for the mounting of the antifriction bearing 6a which is installed in the central opening 3a of the flywheel 3 or on the free end portion 15a of the protuberance 15 of the flywheel 2 before the flywheel 3 is introduced into the space within the annular chamber 11. Thus, the bearing 6a forms part of the aforementioned prefabricated module which is ready to be secured to the output element of the engine.

The fasteners 8 are preferably introduced into the openings 7 of the radially extending portion at the assembly plant. They are held in requisite positions for rapid and convenient introduction of their shanks into the tapped bores or holes of the output element of the engine. This can be achieved in a simple way by utilizing elastic inserts which yieldably hold the fasteners 8 in positions corresponding to that of the lower fastener 8 of FIG. 1, i.e., in such axial positions that the tips of their shanks do not extend, or do not extend appreciably, beyond the exposed side of radial portion 14 of main section 13 of the primary flywheel 2. It is presently preferred to utilize fasteners 8 of the type known as hexagonal socket screws or bolts.

The clutch plate 5 is centered between the friction surface 29 of the flywheel 3 and the pressure plate 26 of the clutch 4 in the prefabricated or preassembled module in such angular position that each of its holes or bores 36 is in full or adequate alignment with a hole or bore 37 of the diaphragm spring 25 and with a hole or bore 33 of the flywheel 3. The fully assembled module is then ready for storage, shipment or attachment to the output element of the engine. Attachment to the output element of the engine takes up a small fraction of the time which would be required in the absence of assembly of the composite flywheel 1 and friction clutch 4 into a module because the clutch plate 5 would have to be centered at the locus of installation into the power train of the motor vehicle and such centering, as well as other centering operations, would necessitate the utilization of a conventional centering mandrel which is not needed for the purpose of installing the module including the composite flywheel 1 and the clutch 4 of the improved apparatus. Insertion of fasteners 8 in the aforedescribed manner (to positions corresponding to that of the lower fastener 8 of FIG. 1) also contributes to simplicity of installation of the module and to a reduction of the interval of time which is required to carry out such installation.

The heretofore described features of the improved apparatus are described and shown in the aforementioned commonly owned copending patent application Ser. No. 07/708,934.

In accordance with a feature of the invention, and as shown in detail in FIG. 2, the circular central opening 3a of the secondary flywheel 3 receives the antifriction bearing 6a as well as an enclosure or jacket 38 which can be made of heat insulating plastic material and cooperates with a reinforced sealing ring 53 to seal the space between the races 16, 17 and to thus prevent the escape of lubricant (such as oil or grease) which is used to contact the rolling elements 6a'. The enclosure 38 includes a first wall 39 which surrounds the entire peripheral surface of the outer race 17 and is integral with the radially outermost portion 41 of a radially extending second wall 40. The wall 40 is adjacent those axial ends of the races 16, 17 which are remote from the sealing ring 53, and this wall further comprises a radially inner portion 45 as well as a lubricant-confining pocket 40a between the portions 41, 45. The pocket 40a extends axially of the flywheels 2, 3 in a direction away from those axial ends of the races 16, 17 which are engaged by the sealing ring 53. The enclosure 38 further comprises a third wall 46 which is integral with the radially inner portion 45 of the second wall 40 and is received in a recess or cutout 50 provided in the internal surface of the inner race 16 at that axial end which is remote from the sealing ring 53. The first wall 39 and the radially outer portion 41 of the second wall 40 sealingly engage the outer race 17, and the radially inner portion 45 of the second wall 40 can sealingly engage the inner race 16 so that the right-hand axial end of the space 48 between the races 16, 17 and in the pocket 40a is reliably sealed from the atmosphere. The third wall 46 also contributes to the sealing action between the enclosure 38 and the inner race 16.

The pocket 40a is defined by a radially extending central portion 43 and two substantially mirror-symmetrical frustoconical portions 42, 44 of the second wall 40 of the enclosure 38. The frustoconical portion 42 tapers toward the common axis of the flywheels 2, 3 in a direction away from the sealing ring 53, and the frustoconical portion 44 tapers toward the common axis in the opposite direction, i.e., toward the sealing ring 53. It is within the purview of the invention to modify the cross-sectional area of the pocket 40a by replacing the frustoconical portion 42 and/or 44 with a cylindrical or even polygonal portion.

The free end 47 of the third wall 46 of the enclosure 38 constitutes a short radially inwardly extending collar which abuts the adjacent radially extending shoulder 49 in the recess 50 of the inner race 16. The lubricant can completely or at least partially fill the internal space 48 in the pocket 40a and between the races 16, 17. This pocket enlarges the capacity of the bearing 6a to store lubricant for the rolling elements 6a', i.e. the rolling elements and their tracks (defined by the internal surface of the outer race 17 and by the external or peripheral surface of the inner race 16) can be adequately lubricated for long periods of time. This prolongs the useful life of the entire bearing 6a and of the apparatus including the bearing 6a and the flywheels 2, 3. The provision of a relatively large space 48 for storage of a substantial supply of lubricant ensures that the rolling elements 6a' and their tracks are adequately lubricated for long periods of time even if some of the lubricant is free to escape at the second and/or third wall 40 or 46 of the enclosure 38 and/or at the sealing ring 53.

The radially outer portion 41 of the second wall 40 constitutes an insert between the right-hand end face of the outer race 17 and the adjacent radially inwardly extending collar 49a of the secondary flywheel 3. The collar 49a is provided at that axial end of the outer race 17 which is remote from the sealing ring 53. The portion 41 of the second wall 40 determines the axial position of the outer race 17 (and hence of the entire antifriction bearing 6a) relative to the secondary flywheel 3.

The collar 49a of the flywheel 3 surrounds the pocket 40a, i.e., the latter need not extend axially beyond the right-hand end face of the flywheel 3. The collar 47 of the third wall 46 of the enclosure 38 is closely adjacent to but need not necessarily touch the peripheral surface of the free end portion 15a of the hollow protuberance 15 of the main section 13 of the primary flywheel 2. The recess 50 is an annular clearance between a portion 51 of the inner race 16 and the peripheral surface of the free end portion 15a of the protuberance 15.

The radially extending portion 45 of the second wall 40 can sealingly contact the right-hand end face of the portion 51 of the inner race 16 or it can form therewith a narrow clearance or gap. In the embodiment of FIG. 2, the portion 45 is in actual sealing engagement with the right-hand end face of the portion 51. The portions 45, 51 form a so-called contact seal if they are in actual contact with each other, or a diaphragm gland if they define the aforementioned narrow clearance.

A gland is defined by the third wall 46 of the enclosure 38 and the adjacent internal surface of the axially projecting portion 51 of the inner race 16. The internal surface of the portion 51 of the inner race 16 has a substantially triangular annular projection 53a which bites into the material of the third wall 46 when the mounting of the enclosure 38 on the races 16, 17 is completed. The apex of the projection 53a can actually penetrate into the material of the wall 46 to thus establish a highly reliable sealing action. The number of projections 53a can be increased to two or more. Furthermore the projection or projections 53a can be replaced by, or used jointly with, one or more analogous annular projections at the radially outer side of the wall 46, such annular projections being caused to penetrate into the portion 51 of the inner race 16 when the assembly of the races 16, 17 with the enclosure 38 is completed. Penetration of the projection or projections 53 of the portion 51 into the third wall 46 and/or penetration of one or more projections on the third wall 46 into the internal surface of the portion 51 of the inner race 16 is particularly satisfactory if the enclosure 38 is applied with a certain amount of tension in the radial direction so that the second wall 40 is stretched radially to ensure reliable penetration of projections (including that shown at 53a) into the material of the wall 46 and/or into the material of the inner race 16 at the inner side of the portion 51. One or more contact seals and/or glands can be established between the third wall 46 and the portion 51 and/or shoulder 49 of the inner race 16 when the application of the enclosure 38 is completed.

It is presently preferred to make the enclosure 38 from a temperature resistant and thermally insulating plastic material. A suitable material is polyamide or PEEK (polyether ether ketone).

The sealing ring 53 is disposed at those axial ends of the races 16, 17 which are remote from the second wall 40 of the enclosure 38 and serves to seal the respective axial end of the space 48 between the two races. This sealing ring is carried by the outer race 17 and is in multiple sealing engagement with the peripheral surface of the inner race 16. An axially extending portion 54 of a metallic reinforcing section 59 of the ring 53 surrounds the adjacent portion of the peripheral surface of the outer race 17 and is surrounded, in turn, by the adjacent portion of the first wall 39 of the enclosure 38. The axially extending portion 54 of the reinforcing section 59 of the ring 53 surrounds an axial extension 55 of the outer race 17, the extension 55 being adjacent the internal surface of the outer race and being surrounded by the axially extending portion 54. The left-hand end of the peripheral surface of the outer race 17 is formed with an annular recess 56 which surrounds the extension 55 and receives the axially extending portion 54 of the section 59. This recess 56 is surrounded by the wall 39 of the enclosure 38 and further accommodates a plastic section 60 which is vulcanized or otherwise reliably secured to (e.g., extruded onto) the section 59 and has an elastic annular bead 62 received in an external groove 63 forming part of the recess 56. The radially inner portion 61 of the section 60 carries two elastic lips 57, 58 which seatingly engage the peripheral surface of the inner race 16. The plastic section 60 can be said to constitute a reinforcement for the metallic section 59 of the sealing ring 53 and/or vice versa.

For example, the section 60 and its portion 61 (including the sealing lips 57, 58) can be made of an elastically yieldable plastic material, e.g., an elastomer such as Vitron (TRADEMARK).

The portion 54 and its free end 59a are preferably a press fit on the extension 55 of the outer race 17 to ensure that the ring 53 will remain in an optimum position relative to the races 16 and 17. The bead 62 is also a press fit in the groove 63 to ensure that the ring 53 cannot migrate in the axial direction of the outer race 17. In addition, this bead is surrounded by the adjacent portion of the first wall 39 of the enclosure 38. Still further, the bead 62 can be received in the wall 39 with a snap action to establish a form-locking connection between the enclosure 38 and the sealing ring 53. To this end, the internal surface of the wall 39 is provided with an annular groove 64 which receives the radially outer portion of the properly installed bead 62 and is located radially outwardly of and opposite the groove 63 in the peripheral surface of the extension 55. Thus, the sealing ring 53 can be fixed against axial movement along the races 16, 17 in a number of different ways to even further reduce the likelihood of escape of any, or any appreciable quantities of, lubricant from the space 48 between the races 16 and 17 and in the pocket 40a. The arrangement is preferably such that the bead 62 of the elastically deformable section 60 is stressed in the axial and radial directions as a result of engagement by the surfaces bounding the grooves 63 and 64.

The character 59b denotes in FIG. 2 that portion of the metallic section 59 of the sealing ring 53 which is vulcanized or otherwise connected to the portion 61 of the elastically deformable section 60. The material of the sealing lips 57, 58 may but need not be the same as that of the bead 62.

The sealing ring.53 prevents, or at least greatly reduces, leakage of lubricant from the space 48 at the respective axial ends of the races 16, 17, and the enclosure 38 performs the same function at the other axial ends of the two races. A reliable sealing action between the enclosure 38 and the ring 53 is established in the region of the elastically deformable bead 62. The sealing ring 53 further cooperates with the enclosure 38 and with the races 16, 17 to form a self-sustaining prefabricated unit or module which can be installed between the flywheels 2, 3 with little loss in time. Moreover, the radially extending portion 41 of the second wall 40 of the enclosure 38 cooperates with the collar 49a of the secondary flywheel 3 to ensure predictable axial positioning of the races 16, 17 relative to the flywheel 3.

An important advantage of the structure which is shown in FIG. 2 is that the useful life of the bearing 6a is much longer than that of heretofore known antifriction bearings for use between two flywheels or between a stationary component and a rotary component. Thus, the pocket 40a constitutes a reservoir for storage of an additional substantial amount of lubricant (such as grease) for the rolling elements 6a', namely an amount in addition to that which can be confined between the internal surface of the outer race 17 and the external or peripheral surface of the inner race 16. In the absence of any obstructions outwardly adjacent the second wall 40 of the enclosure 38, the reservoir or pocket 40a can be enlarged in a direction toward the hub 5a and the clutch plate 5 of the friction clutch 4 which is shown in FIG. 1. The larger the capacity of the pocket 40a, the longer is the useful life of the bearing 6a and of the apparatus in which the bearing is put to use. This is of particular importance in apparatus of the type shown in FIG. 1 in which the bearing 6a is accessible only upon at least partial dismantling and/or upon separation of the apparatus from the input element of the engine.

The third wall 46 of the enclosure 38 exhibits the advantage that it can establish with the inner race 16 at least one contact seal or a gland to even further reduce the likelihood of escape of any, or the likelihood of escape of a substantial quantity of, lubricant from the, pocket 40a. Such sealing action is enhanced when the bearing 6a rotates and the third wall 46 is subjected to the action of centrifugal force which tends to urge it radially outwardly toward the internal surface of the inner race 16. The seal or seals between the third wall 46 and the inner race 16 assist the seal or seals between the radially inner portion 45 of the second wall 40 and the adjacent end face of the inner race 16. The seal or seals between the inner race 16 and the third wall 46 of the enclosure 38 can include one or more annular contact seals and/or one or more glands each with one or more clearances. As stated above, the sealing action between the third wall 46 and the race 16 improves when at least the outer race 17 and the enclosure 38 rotate so that the wall 46 is acted upon by centrifugal force.

Figures 3, 4:
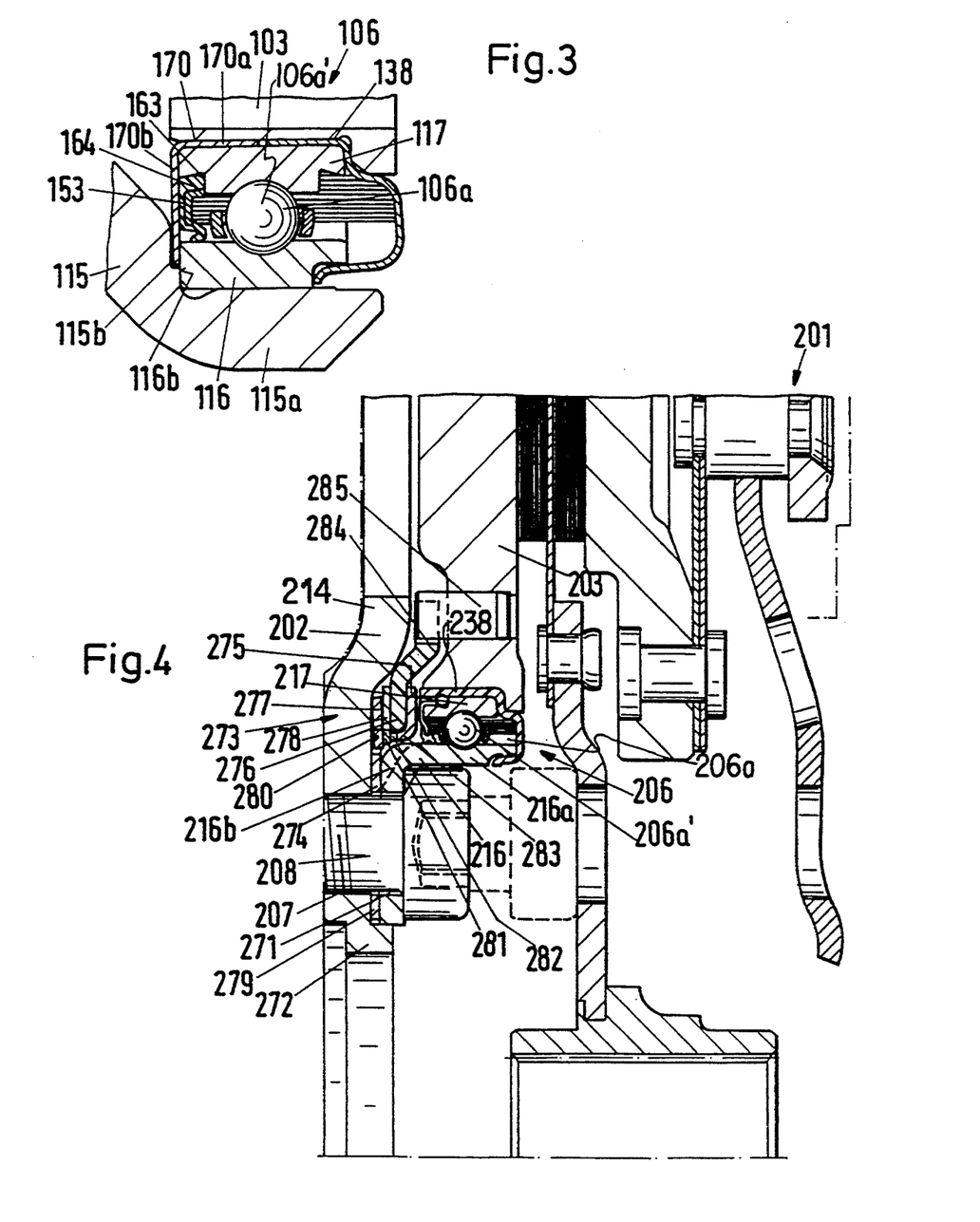
FIG. 3 is a view similar to that of FIG. 2 but showing a modified antifriction bearing.
FIG. 4 is a fragmentary axial sectional view of an apparatus wherein the flywheels surround a third antifriction bearing.

The annular projection or projections 53a also contribute to the sealing action between the third wall 46 and the inner race 16. Such projection or projections and the adjacent portion or portions of the neighboring part (46 or 16) cooperate to form one or more contact seals and/or glands with minimal clearance, and the sealing action of such seals or glands also improves when the inner race 16 and/or the third wall 46 is acted upon by centrifugal force. Thus, each projections 53a penetrates into the adjacent surface to form therein a temporary or permanent groove or recess and to thus enhance the sealing action. The sealing action of the projection or projections 53a can be enhanced still further if the third wall 46 consists of a deformable plastic material or if the radially outer side of the third wall 46 is coated with a layer of deformable plastic material. The same holds true if the projection or projections 53a or analogous projections are provided at the outer side of the third wall 46 to penetrate into the material of the inner race 16 or into a deformable liner which coats the internal surface of the race 16. The aforediscussed liner can consist of a heat insulating plastic material, particularly if the third wall 46 is made of metallic sheet material (FIG. 3).

The sealing ring 53 exhibits the advantage that it can perform the additional function of preventing radial expansion of the outer race 17 if the outer race constitutes a split ring which must be expanded in order to permit insertion of rolling elements 6a' between the two races. Once the sealing ring 53 is applied subsequent to insertion of the rolling elements 6a', the outer race is held in the radially contracted condition to ensure that the radial width of the space between the races 16, 17 is not increased in actual use of the bearing 6a.

The elastically deformable bead 62 of the sealing ring 53 contributes to reliable sealing action between the axially extending portion of the sealing ring and the outer race 17 as well as between the first wall 39 of the enclosure 38 and the sealing ring. The sealing action is particularly satisfactory if the bead 62 is installed in deformed condition such that it is stressed in the axial and/or radial direction of the race 17.

A bearing which does not employ a cage (6b) and wherein the rolling elements constitute spheres is preferred in many instances because it is capable of standing elevated stresses as a result of an increase of the number of rolling elements.

As mentioned above, the rolling elements 6a' can be readily introduced into the tracks of the races 16, 17 if the outer race is split so that it is capable of undergoing radial expansion. The radial expandibility no longer exists when the application of the sealing ring 53 is completed because this ring holds the outer race against radial expansion.

The races 16, 17 and the rolling elements 6a' between them constitute a preassembled unit or module as soon as the application of the enclosure 38 and sealing ring 53 is completed. Such prefabricated module can be manipulated in a time saving manner.

The frustoconical portions 42, 44 of the second wall 40 of the enclosure 38 constitute an optional feature of the improved module. Such configuration of portions 42, 44 of the second wall 40 promotes the flow of lubricant toward the rolling elements 6a'. In addition, the conical external surfaces of portions 42, 44 can serve as ramps for more convenient installation of the module including the races 16, 17, rolling elements 6a', enclosure 38 and sealing ring 53, for example, during introduction of the module into the central opening 3a of the secondary flywheel 3.

FIG. 3 shows a modified friction reducing unit 106 having an antifriction bearing 106a. All such parts of the structure of FIG. 3 which are identical with or clearly analogous to the corresponding parts of the structure shown in FIG. 2 are denoted by similar reference characters plus 100. An important difference between the embodiments of FIGS. 2 and 3 is that the enclosure which is shown in FIG. 3 is made of a metallic sheet material and includes two sections 138, 170. These sections jointly form a cylindrical first wall which surrounds the peripheral surface of the outer race 117 and is surrounded, in turn, by the internal surface of the secondary flywheel 103. The section 170 of the enclosure which is shown in FIG. 3 performs the function of the sealing ring 53 of the embodiment of FIG. 2 in that it establishes a seal at the left-hand axial end of the space including that between the races 116 and 117 and confining the spherical rolling elements 106a'.

If it is desired to enhance the heat insulating properties of the enclosure for the bearing 106a of FIG. 3, the sections 138, 170 of the enclosure are made of a suitable plastic material, e.g., the material of which the enclosure 38 of FIG. 2 is made. Adequate thermal insulation of the bearing 6a or 106a (and especially of the lubricant for the rolling elements 6a' or 106a') is desirable because the secondary flywheel 3 or 103 is likely to be heated to an elevated temperature during engagement or disengagement of the friction clutch 4, i.e., when the clutch plate 5 slips relative to the pressure plate 26 and the secondary flywheel 3 or 103. Excessive heating of the bearing 6a or 106a is undesirable on the additional ground that this would result in uncontrollable thermal expansion of the inner and/or outer race so that the primary and/or the secondary flywheel would run out of true. Still further, undue expansion of the races of the bearing 6a or 106a could interfere with the freedom of rotation of the two flywheels relative to each other.

The section 138 of the enclosure which is shown in FIG. 3 is similar to the enclosure 38 for the flywheels 16, 17 of FIG. 2. The main difference is that the axially extending first wall of the section 138 overlies only approximately one-half of the peripheral surface of the outer race 117. The section 170 has an L-shaped cross-sectional outline with an axially extending cylindrical leg 170a which overlies the other half of the peripheral surface of the outer race 117 and a radially extending ring-shaped or washer-like leg 117b which overlies the left-hand end faces of the races 116, 117. The radially inner portion of the leg 117b may but need not actually contact the adjacent end face 116b of the inner race 116; at any rate, the leg 117b and the inner race 116 preferably establish a seal against the escape of any, or against the escape of excessive quantities of, lubricant from the space between the races 116 and 117.

Each of the sections 138, 170 can be a press fit on the outer race 117. In addition to or in lieu of such mounting, the section 138 and/or 170 can be bonded (e.g., with a suitable adhesive) to the outer race 117. The shaping of sections 138, 170 can be completed before the two sections are slipped onto the respective axial ends of the outer race 117.

The radially inner portion of the radially extending leg 170b of the section 170 is received in a shallow cutout or depression 115b which is provided in the hollow protuberance 115 of the primary flywheel adjacent the cylindrical end portion 115a. The clearance between the bottom wall of the recess 115b and the adjacent end face 116b of the inner race 116 is sufficient to snugly receive the radially inner portion of the leg 170b. The inner race 116 is or can be a press fit on the cylindrical portion 115a.

The structure of FIG. 3 further comprises a modified sealing ring 153 which is installed in the left-hand end portion of the annular space between the races 116, 117. This sealing ring is preferably reinforced or armored, e.g., in the same way as described with reference to the sealing ring 53 of FIG. 2. Thus, the ring 153 can also include a reinforcing section of a metallic material and a second section of elastomeric plastic material. As can be seen in FIG. 3, the sealing ring 153 is installed in the space between the races 116, 117 adjacent the median or intermediate portion of the radially extending leg 170b of the section 170 of the enclosure or jacket for the two races. The leg 170b cooperates with the ring 153 to establish a dual sealing action at the left-hand axial end of the space between the flywheels 116 and 117.

The bead 164 of the elastic section of the sealing ring 153 is received in an undercut groove 163 which is provided in the internal surface of the outer race 117. The bead 164 is preferably installed in axially and/or radially stressed condition and is closely or immediately adjacent the radially extending leg 170b of the section 170.

The encapsulation of lubricant in the antifriction bearing 206a of the friction reducing unit 206 of FIG. 4 is analogous to or identical with the encapsulation (in 38, 53) of the bearing 6a of FIG. 2. The enclosure 238 is confined in the central opening of a secondary flywheel 203 forming part of a composite flywheel 201 which further includes a primary flywheel 202.

The inner race 216 of the bearing 206a has an L-shaped cross-sectional outline and is made of a metallic sheet material. This inner race comprises an axially extending cylindrical portion or leg 216a which defines a track for the rolling elements 206a', and a radially inwardly extending washer-like or disc-shaped portion or leg 216b engaged by the heads of fasteners 208 which serve to secure the primary flywheel 202 to the crankshaft or to another suitable rotary output element of an engine. The axially extending leg 216a is provided with two or more tracks if the bearing 206a comprise two or more rows or annuli of rolling elements 206a'.

The leg 216b of the inner race 216 has openings 271 in a distribution (as seen in the circumferential direction of the flywheel 202) corresponding to that of openings 207 for the shanks of fasteners 208. The openings 207 are provided in the flywheel 202 radially inwardly of the axially extending cylindrical leg 216a of the inner race 216. This inner race is centered by the radially extending portion 214 of the primary flywheel 202, namely by a set of centering projections 272 which are adjacent the internal surface of the radially extending leg 216b of the inner race. Proper centering of the inner race 216 on the primary flywheel 202 results in proper centering of the outer race 217 and secondary flywheel 203.

When the composite flywheel 201 is properly mounted on the output element of the engine, the radially inner part of the radially extending portion 214 of the flywheel 202 is clamped between the flange (not shown) at the adjacent end of the output element and the heads of the fasteners 208 which urge the radially extending leg 216b of the inner race 216 toward the adjacent side of the portion 214. In other words, the fasteners 208 can be said to secure the inner race 216 to the output element of the engine.

The outer race 217 can also be made of metallic sheet material.

The damping action between the flywheels 202 and 203 can be enhanced if the apparatus including the structure of FIG. 4 comprises a damper (corresponding to the damper 9 of FIG. 1) which acts circumferentially of the composite flywheel 201, and with a damper 273 which generates friction and can be responsive to load or can generate a delayed frictional damping action. The illustrated second damper 273 is installed directly between the flywheels 202, 203 and is adjacent the inner side of the radially extending portion 214 of the primary flywheel 202 at the radial level of the anti-friction bearing 206a, i.e., close to the output element of the engine.

As can be seen in FIG. 4, the damper 273 comprises a disc 274 which is made of metallic sheet material and includes a substantially radially extending radially outer portion 275 in engagement with a friction ring 276 which is biased by a diaphragm spring 277. A pressure transmitting washer 278 is disposed between the friction ring 276 and the diaphragm spring 277. The radially extending radially inner portion 279 of the disc 274 has cutouts for the shanks of the fasteners 208 and is clamped between the radially inner part of portion 214 of the flywheel 202 and the radially extending leg 216b of the inner race 216.

The radially outer portion of the diaphragm spring 277 reacts against the portion 214 of the flywheel 202 and its radially inner portion bears upon the washer 278. The washer 278 and/or the diaphragm spring 277 is provided with projections 280, 281 in the form of lugs which extend in the radial direction from the radially innermost part of the spring 277 and/or washer 278 and are received in sockets (recesses or cutouts) 282 of the disc 274 to prevent rotation of the washer 278 and/or spring 277 relative to the disc 274. The friction ring 276, the washer 278 and the diaphragm spring. 277 surround an axially extending portion 283 of the disc 274; the axially extending portion 283 connects the radially extending portions 275 and 279 of the disc 274.

The friction ring 276 extends radially outwardly beyond the radially outermost portion of the disc 274 and is provided with abutments or projections 284 which, in the embodiment of FIG. 4, are obtained by providing the friction ring 276 with radially extending cutouts which alternate with the projections 284. The projections 284 cooperate with complementary projections or abutments 285 which are provided on the secondary flywheel 203. In the embodiment of FIG. 4, the projections 285 of the secondary flywheel 203 are pins or studs which are anchored in and extend axially of the secondary flywheel so that each thereof can enter a recess between two neighboring projections 284 of the friction ring 276. The arrangement is preferably such that the width of the recesses or cutouts between the projections 284 of the friction ring 276 exceeds the diameters of the pins or studs 285 to thus ensure that the parts 203, 276 have limited freedom of angular movement relative to each other. This results in the establishment of a delayed frictional damping action whenever the direction of rotation of the flywheel 203 relative to the flywheel 202 (or vice versa) is reversed. The extent of such delay prior to development of frictional damping action can be selected by the manufacturer as a result of appropriate dimensioning of the pins or studs 285 and/or as a result of appropriate selection of the width (in the circumferential direction of the flywheel 203) of the recesses or cutouts between neighboring projections 284 of the friction ring 276.

It is possible to modify the structure of FIG. 4 in such a way that the pins or studs 285 are snugly received in the recesses between the neighboring projections 284 so that a frictional damping action is established as soon as one of the flywheels 202, 203 begins to turn relative to the other in either direction. The frictional damping device 273 is then active to assist the primary damper (corresponding to the damper 9 of FIG. 1) during each and every stage of relative angular movement between the flywheels 202 and 203.

The improved bearing and the apparatus utilizing such bearing are susceptible of numerous additional modifications. For example, the features of the structure which is shown in FIGS. 1 and 2 can be combined with those of the structure shown in FIG. 3 and/or 4, and the features of the structure which is shown in FIG. 3 can be combined with those which are shown in FIG. 4. Furthermore, the invention is embodied in the antifriction bearing, in a combination of such bearing with an enclosure and/or sealing ring, as well as in a combination of the bearing with other component parts of the improved torque damping apparatus. As presently advised, particularly the structure which is shown in FIG. 4 (and employs a bearing with an enclosure and a sealing ring corresponding to or identical with those shown in FIG. 2) embodies a number of features which are novel per se as well as in various combinations with one another.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A composite flywheel comprising:
   a primary flywheel (202) having a radially extending portion (214), said primary flywheel (202) being fastenable to an engine;
   a secondary flywheel (203) rotatable relative to said primary flywheel (202), said secondary flywheel being connectable to an input shaft of a transmission;
   a component (216) having an axially extending portion (216a), said component (216) being supported by an inner portion of the radially extending portion (214) of said primary flywheel;
   a bearing (206) disposed between said primary flywheel (202) and the component (216), said bearing being arranged to provide rotation of said primary flywheel and said secondary flywheel relative to each other;
   a damper (9) disposed between said primary flywheel (202) and said secondary flywheel (203); and
   a second damper (273) disposed between said primary flywheel (202) and said secondary flywheel (203) comprising a friction ring (276) disposed axially between the radially extending portion (214) of said primary flywheel and an annular portion (275) of a disk (274), said disc (274) further having radially extending portions (279) disposed radially inwardly of said annular portion (275) and being clamped axially between said component (216) and said radially extending portion (214) of said primary flywheel (202).

2. The composite flywheel of claim 1 wherein said radially extending portion (279) of said disk (274) comprises recesses (208) for fastening means for fastening said primary flywheel (202) to an output element of the engine.

3. The composite flywheel of claim 2 wherein said radially extending portion (214) of said primary flywheel (202) comprises recesses for fastening means (207, 271), said component (216) having recesses for fastening means, and said recesses (208) in said disk (274) are axially aligned with said recesses in said radially extending portion (214) of said primary flywheel (202) and said recesses in said component (216).

4. The composite flywheel of claim 1 wherein said annular portion (275) of said disk (274) is axially offset from said radially extending portions (279) of said disk (274), whereby said radially extending portions (279) are relatively closer to said primary flywheel (202) than said annular portion (275).

5. The composite flywheel of claim 1 wherein said friction ring (276) is supported directly on said disk (274).

6. The composite flywheel of claim 1 further comprising a washer (278) and a diaphragm spring (277), said washer (278) and diaphragm spring (277) being disposed axially between said friction ring (276) and said radially extending portion (214) of said primary flywheel (202).

7. The composite flywheel of claim 6 wherein said disk (274) further comprises first detents (282) and said washer (278) includes complementary second detents (281) which engage said first detents (282).

8. The composite flywheel of claim 1 wherein said disk (274) has radially extending outer portions and said friction ring (276) extends radially outwardly beyond said radially extending outer portions of said disk (274) and includes abutments (284), said secondary flywheel (203) further comprising complementary abutments (285) wherein said abutments (284) of said friction ring (276) interact with said complementary abutments (285).

9. The composite flywheel of claim 1 wherein said second damper (273) is carried by said primary flywheel (202) and is engaged by said secondary flywheel (203).

10. The composite flywheel of claim 9 wherein when said second damper (273) and said secondary flywheel (203) have at least some freedom of angular movement relative to each other.

11. The composite flywheel of claim 1 wherein said radially extending portion (214) of said primary flywheel (202) is made of sheet metal.

12. The composite flywheel of claim 1 wherein said second damper (273) operates directly between said primary flywheel (202) and said secondary flywheel (203).

13. The composite flywheel of claim 1 wherein said second damper (273) is disposed axially between said bearing (206) and said radially extending portion (214) of said primary flywheel (202), said radially extending portion being connectable to the engine.

14. The composite flywheel of claim 11 wherein said bearing (206) is an anti-friction bearing.

* * * * *

UNITED STATES PATENT AND TRADEMARK OFFICE
CERTIFICATE OF CORRECTION

PATENT NO. : 5,441,452
DATED : August 15, 1995
INVENTOR(S) : Johann JÄCKEL and Albert ALBERS It is certified that error appears in the above-indentified patent and that said Letters Patent is hereby corrected as shown below:

Title page, [54], change "ANTIFRICTION BEARING FOR USE IN APPARATUS FOR DAMPING FLUCTUATIONS OF TORQUE IN POWER TRAINS OF MOTOR VEHICLES" to --COMPOSITE FLYWHEEL--.

Column 1, lines 2-5, change "ANTIFRICTION BEARING FOR USE IN APPARATUS FOR DAMPING FLUCTUATIONS OF TORQUE IN POWER TRAINS OF MOTOR VEHICLES" to --COMPOSITE FLYWHEEL--.

Signed and Sealed this

Second Day of January, 1996

*Attest:*

BRUCE LEHMAN

*Attesting Officer*    Commissioner of Patents and Trademarks